Thompson & Darling.
Milk Cooler.
Nº 89,901.   Patented May 11, 1869.
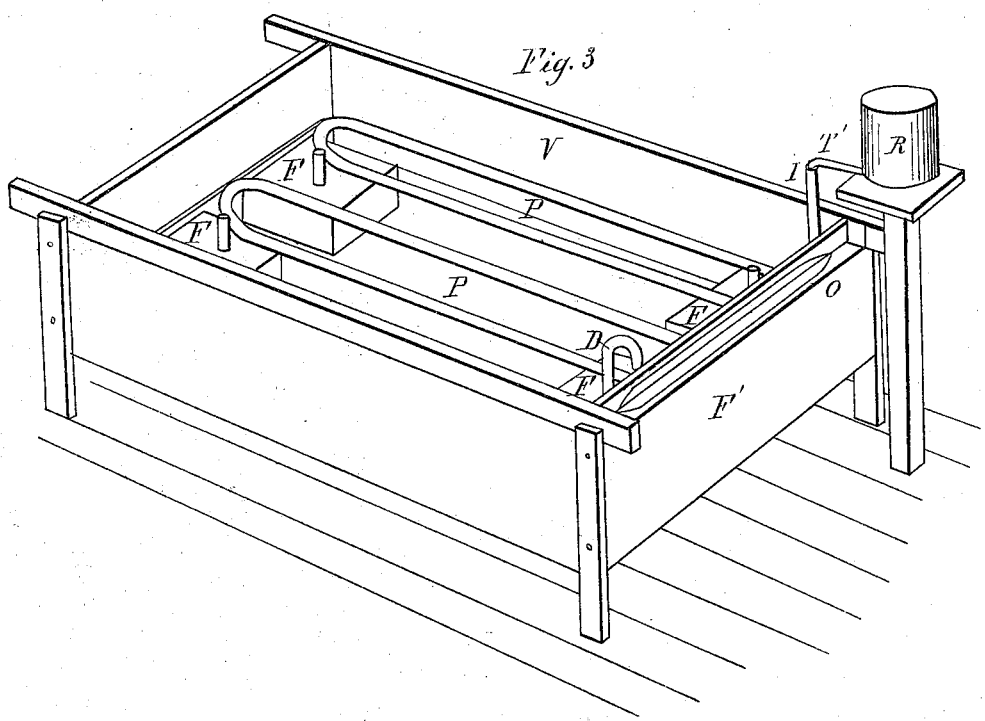
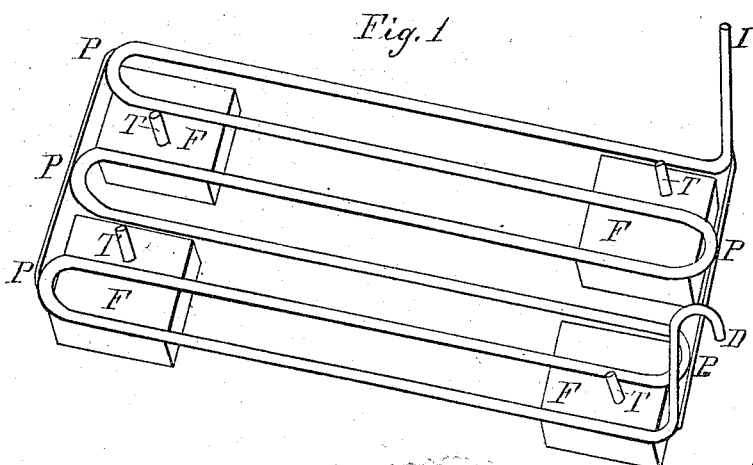
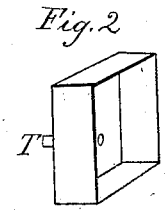
Witnesses
H. B. Foster.
F. Seidel
Inventors
Asaph Thompson.
James Darling.

United States Patent Office.

ASAPH THOMPSON, OF HUDSON, AND JAMES DARLING, OF NORTHFIELD TOWNSHIP, OHIO.

*Letters Patent No. 89,901, dated May 11, 1869.*

IMPROVEMENT IN MILK-COOLERS.

The Schedule referred to in these Letters Patent and making part of the same.

*To all whom it may concern:*

Be it known that we, ASAPH THOMPSON, of the town of Hudson, in the county of Summit, and State of Ohio, and JAMES DARLING, of the township of Northfield, county and State aforesaid, have invented a new and useful Milk-Cooler, called "Thompson and Darling's Buckeye Milk-Cooler for Cheese-Factories," for cooling milk and other liquids; and we do hereby declare that the following is a full and exact description of the construction and operation of the same, reference being had to the annexed drawings, and the letters of reference marked thereon, making a part of this specification, in which—

Figure I represents the pipes, through which the cooling-liquid flows, detached from the vat or reservoir containing the liquid to be cooled, with the floats attached (in one style) to the pipes; and I, in said figure, is the induction-pipe, through which the cooling-liquid enters the pipes.

P P P P P, the pipes, arranged, in the figure, in parallel lines, for rectangular vats or reservoirs, but the shape of which is determined by and adapted always to the form of said vats.

D is the discharge-pipe.

F F F F are the floats, which support the pipes in the vat.

These may be made of any size, shape, or material, and may be placed below, or between, or at any distance above the pipes, according as the pipes are used on or at a greater or less depth beneath the surface of the liquid to be cooled.

T T T T are the tubes or faucets, to regulate the amount of air in the floats, and thus lower the pipes in the vat.

Figure II represents one of the floats detached, in which T is the tube to regulate the amount of air in the float, and thus control its supporting-power.

In place of this tube, with its cock, a faucet, or any other equivalent device may be used. These may be made of different materials, and placed in different positions, as hereinbefore stated.

The figure represents one made of tin, air-tight, open at the bottom, and standing upon its side.

Figure III represents the pipes in position in the vat, and ready for use.

R is the reservoir, for containing the supply, in quantity, of the cooling-liquid, as water, or water and ice.

T', the tube or pipe, leading from the reservoir to the induction-pipe I.

This tube is made of flexible material, as India rubber, to accommodate itself to the varying heights of the pipes.

P, &c., are the pipes.

F, &c., are the floats.

D, the discharge-pipe.

V is the vat, containing the liquid to be cooled.

F', the frame supporting the vat.

O is an opening, into which the water falls from the discharge-pipe, and flows back beneath the vat, and escapes at the other end of the frame.

The operation of this invention is as follows:

Into the vat V the milk is put. Then the pipes are inserted, and the cooling-liquid is set to flowing through them, the pipes being, by means of the floats, kept upon or at any desired depth beneath the surface of the milk or other liquid to be cooled, and the flow is kept up until the milk in the vat is reduced to, or nearly to, the temperature of the liquid flowing through the pipes; then the pipes are removed, and the milk is ready for use.

What we claim as our invention, and desire to secure by Letters Patent, is—

1. The combination of the horizontal pipes P P, &c., for the cooling-liquid to flow through, with the floats F F, &c., or their equivalents, substantially as and for the purpose set forth in the foregoing specification.

2. The mode of cooling liquids, by horizontal pipes, or their equivalents, kept floating on or at any desired depth beneath the surface of the liquid to be cooled, the pipes adjusting themselves to the varying height of the liquid to be cooled, and having constantly flowing through them the cooling-liquid, substantially as herein set forth.

ASAPH THOMPSON.
JAMES DARLING.

Witnesses:
H. B. FOSTER,
F. SEIDEL.